(12) United States Patent
Fairgrieve et al.

(10) Patent No.: US 10,293,820 B2
(45) Date of Patent: May 21, 2019

(54) VEHICLE SPEED CONTROL SYSTEM AND METHOD

(71) Applicant: JAGUAR LAND ROVER LIMITED, Whitley, Coventry, Warwickshire (GB)

(72) Inventors: Andrew Fairgrieve, Thurlaston (GB); James Kelly, Dorridge (GB); Simon Gilling, Grounds Farm Lane (GB); Daniel Woolliscroft, Alvechurch (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 0 days.

(21) Appl. No.: 16/018,856

(22) Filed: Jun. 26, 2018

(65) Prior Publication Data

US 2018/0297595 A1    Oct. 18, 2018

Related U.S. Application Data

(62) Division of application No. 14/421,938, filed as application No. PCT/EP2013/067011 on Aug. 14, 2013, now abandoned.

(30) Foreign Application Priority Data

Aug. 16, 2012  (GB) ..................................... 1214651
May 1, 2013  (GB) .................................. 1307890.2

(51) Int. Cl.
*B60W 30/14* (2006.01)
*B60T 8/175* (2006.01)
(Continued)

(52) U.S. Cl.
CPC ........... *B60W 30/143* (2013.01); *B60T 8/175* (2013.01); *F16H 61/0213* (2013.01);
(Continued)

(58) Field of Classification Search
None
See application file for complete search history.

(56) References Cited

U.S. PATENT DOCUMENTS 6,385,527 B1    5/2002  Zumberge et al.
8,332,119 B2 *  12/2012  Bach ....................... B60T 7/122
                                                    303/191

(Continued)

FOREIGN PATENT DOCUMENTS

EP    1288056 A2    3/2003
JP    2000038049 A  2/2000
(Continued)

OTHER PUBLICATIONS

Japanese Office Action in Japanese with English translation for Japanese application No. 2015-526981, dated Nov. 15, 2016, 6 pages.
(Continued)

*Primary Examiner* — Redhwan K Mawari
*Assistant Examiner* — Edward Torchinsky
(74) *Attorney, Agent, or Firm* — Reising Ethington P.C.

(57) ABSTRACT

A vehicle control system having a plurality of speed control systems, each operable to cause the vehicle to operate in accordance with a respective target speed. The system is operable wherein one of the plurality of speed control systems may be selected to control vehicle speed at a given moment in time, wherein when responsibility for speed control is transferred from a first one of the plurality of speed control systems to a second one of the speed control systems, the second one of the speed control systems is operable to set a value of target speed thereof to a value corresponding to that of the target speed of the first.

20 Claims, 7 Drawing Sheets

(51) Int. Cl.
*F16H 61/02* (2006.01)
*F16H 59/66* (2006.01)
*B60W 50/00* (2006.01)

(52) U.S. Cl.
CPC ....... *B60T 2201/04* (2013.01); *B60T 2210/14* (2013.01); *B60T 2210/16* (2013.01); *B60T 2220/04* (2013.01); *B60T 2260/06* (2013.01); *B60W 2050/0091* (2013.01); *B60W 2550/141* (2013.01); *B60Y 2200/20* (2013.01); *F16H 59/66* (2013.01); *F16H 2061/0234* (2013.01)

(56) References Cited

U.S. PATENT DOCUMENTS

| | | | | |
|---|---|---|---|---|
| 9,283,844 | B2* | 3/2016 | Franganillo | B60K 31/00 |
| 2004/0084237 | A1 | 5/2004 | Petrie, Jr. | |
| 2005/0222717 | A1 | 10/2005 | Erban et al. | |
| 2010/0084237 | A1 | 8/2010 | Bartos et al. | |
| 2010/0198450 | A1 | 8/2010 | Shin | |
| 2011/0066344 | A1* | 3/2011 | Niwa | B60W 10/06 701/70 |
| 2013/0030668 | A1* | 1/2013 | Eriksson | B60W 10/06 701/94 |
| 2015/0298697 | A1* | 10/2015 | Kelly | B60W 50/082 701/37 |
| 2016/0023657 | A1* | 1/2016 | Fairgrieve | B60W 30/143 701/93 |
| 2016/0023658 | A1* | 1/2016 | Kelly | B60W 50/085 701/94 |
| 2016/0031444 | A1* | 2/2016 | Fairgrieve | B22D 21/005 701/93 |
| 2016/0039415 | A1* | 2/2016 | Brockley | B60W 50/06 701/94 |

FOREIGN PATENT DOCUMENTS

| | | | | |
|---|---|---|---|---|
| JP | 2000038050 A | 2/2000 | | |
| WO | WO-9850246 A1 * | 11/1998 | ............ | B60K 28/16 |
| WO | WO9850246 A1 | 11/1998 | | |

OTHER PUBLICATIONS

Australian Patent Examination Report No. 1 corresponding to AU application No. 2013304091, dated Aug. 31, 2015, 3 pages.
International Search Report for application No. PCT/EP2013/067011, dated Oct. 23, 2013, 4 pages.
UK Combined Search and Examination Report for corresponding application No. 1307890.2, dated Aug. 9, 2013, 6 pages.
Written Opinion for application No. PCT/EP2013/067011, dated Oct. 23, 2013, 5 pages.

* cited by examiner

VEHICLE SPEED CONTROL SYSTEM AND METHOD

FIELD OF THE INVENTION

The invention relates to a system for controlling the speed of a vehicle. In particular, but not exclusively, the invention relates to a system for controlling the speed of a land-based vehicle which is capable of driving in a variety of different and extreme terrains and conditions.

BACKGROUND

In known vehicle speed control systems, typically referred to as cruise control systems, the vehicle speed is maintained on-road once set by the user without further intervention by the user so as to improve the driving experience for the user by reducing workload.

The user selects a speed at which the vehicle is to be maintained, and the vehicle is maintained at that speed for as long as the user does not apply a brake or, in some systems, the clutch. The cruise control system takes its speed signal from the driveshaft or wheel speed sensors. When the brake or the clutch is depressed, the cruise control system is disabled so that the user can override the cruise control system to change the vehicle speed without resistance from the system. If the user depresses the accelerator pedal the vehicle speed will increase, but once the user removes his foot from the accelerator pedal the vehicle reverts to the pre-set cruise speed.

More sophisticated cruise control systems are integrated into the engine management system and may include an adaptive functionality which takes into account the distance to the vehicle in front using a radar-based system. For example, the vehicle may be provided with a forward-looking radar detection system so that the speed and distance of the vehicle in front is detected and a safe following speed and distance is maintained automatically without the need for user input. If the lead vehicle slows down, or another object is detected by the radar detection system, the system sends a signal to the engine or the braking system to slow the vehicle down accordingly, to maintain a safe following distance.

Such systems are usually operable only above a certain speed, typically around 15-20 kph, and are ideal in circumstances in which the vehicle is travelling in steady traffic conditions, and particularly on highways or motorways. In congested traffic conditions, however, where vehicle speed tends to vary widely, cruise control systems are ineffective, and especially where the systems are inoperable because of a minimum speed requirement. A minimum speed requirement is often imposed on cruise control systems so as to reduce the likelihood of low speed collision, for example when parking. Such systems are therefore ineffective in certain driving conditions (e.g. low speed) and are set to be automatically disabled in circumstances in which a user may not consider it to be desirable to do so.

Known cruise control systems also cancel in the event that a wheel slip event is detected requiring intervention by a traction control system (TCS) or stability control system (SCS). Accordingly, they are not well suited to maintaining vehicle progress when driving in off road conditions where such events may be relatively common.

It is also known to provide a control system for a motor vehicle for controlling one or more vehicle subsystems. U.S. Pat. No. 7,349,776, the content of which is hereby incorporated by reference, discloses a vehicle control system comprising a plurality of subsystem controllers including an engine management system, a transmission controller, a steering controller, a brakes controller and a suspension controller. The subsystem controllers are each operable in a plurality of subsystem function modes. The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the sub-systems is set to the function mode most appropriate to those conditions. Such conditions are linked to types of terrain over which the vehicle may be driven such as grass/gravel/snow, mud and ruts, rock crawl, sand and a highway mode known as 'special programs off' (SPO). The vehicle mode controller may be referred to as a Terrain Response (TR) (RTM) System or controller. The driving modes may also be referred to as terrain modes, terrain response modes, or control modes.

It is desirable to provide a speed control system capable of controlling vehicle speed at relatively low speeds and whilst driving in off road conditions.

SUMMARY

Embodiments of the invention may be understood with reference to the appended claims.

Aspects of the present invention provide a system, a vehicle and a method.

In one aspect of the invention for which protection is sought there is provided a vehicle control system comprising a plurality of speed control systems each operable to cause the vehicle to operate in accordance with a respective target speed, wherein when responsibility for speed control is transferred from a first one of the plurality of speed control systems to a second one of the speed control systems, a value of target speed of the second speed control system is set to a value dependent on the target speed of the first speed control system.

Embodiments of the present invention have the advantage that the target speed of the second one of the speed control systems may be set independently of the current vehicle speed. Thus, if when the driver commands a change from one speed control system to another the vehicle is temporarily travelling at a speed that is greater than or less than the current value of target speed of the first one of the speed control systems, the value of target speed of the second one of the speed control systems may be set to a value that is dependent on the value of target speed of the first speed control system, and not on the instant vehicle speed.

It is to be understood that if the newly selected speed control system were to set the value of target speed thereof to the instant vehicle speed at the moment the new speed control system was selected, vehicle composure may be affected and driver workload increased. By way of example, when operating with the first one of the speed control systems active, the first speed control system may reduce temporarily the value of target speed in dependence on one or more factors such as the terrain over which the vehicle is travelling. The first speed control system may subsequently accelerate the vehicle back to the target speed value when it determines that the terrain is suitable for travel at that value of target speed. Whilst the first one of the speed control systems is accelerating the vehicle to the current target speed value, the driver may choose to switch speed control to the second one of the speed control systems from the first. If the second speed control system were to set the value of target speed thereof to the instant vehicle speed, acceleration to the target speed value of the first speed control system would be interrupted, potentially reducing vehicle composure. If the driver did wish to travel at the same value of target speed as the first speed control system, the driver would then be required to adjust the target speed of the second speed control system to the value of the first speed control system. Thus driver workload may be reduced in embodiments of the present invention.

Advantageously, the system may be operable to set the target speed of the second one of the speed control systems to the instant value of the target speed of the first one of the speed control systems when the second one of the speed control systems assumes responsibility for controlling vehicle speed from the first one of the speed control systems.

This feature has the advantage that an abrupt change in target speed when the second one of the speed control systems assumes responsibility for speed control from the first one of the speed control systems may be avoided. This may improve vehicle composure by preventing sudden changes in vehicle speed and allowing traction to be maintained on difficult and varied terrain.

For example, a vehicle may be equipped with a low speed progress control (LSP) system (or low speed cruise control system) and a hill descent control (HDC) system each operable to cause the vehicle to operate in accordance with a target speed. If the LSP system is currently selected and the target speed is set to 10 kph, if the driver subsequently selects a hill descent control (HDC) system to assume speed control the HDC system controls vehicle speed in accordance with a target speed having the same value, i.e. 10 kph. A driver may therefore enjoy a smooth, coordinated transition from one speed control system to another.

Suitable HDC systems are described in patent applications GB2342969, GB2341430, GB2325716 & GB2308415, the contents of which are incorporated herein by reference.

One or more of the speed control systems may be operable to cause the vehicle to operate in accordance with a respective temporary maximum speed value that is less than the instant target speed in dependence on one or more parameters.

Thus, if the temporary maximum speed value is less than the respective target speed the selected speed control system causes the vehicle to operate in accordance with the temporary maximum value and not the target speed.

Optionally, one or more of the speed control systems are operable to resume operation at the target speed thereof if the temporary maximum speed value becomes greater than or equal to the target speed or the speed control system no longer causes the vehicle to operate in accordance with the temporary maximum speed value.

Advantageously the system may be operable to set the temporary maximum speed value of one or more of the speed control systems in dependence on a type of terrain in which the vehicle is operating.

The system may be operable to receive one or more signals indicative of a type of terrain in which the vehicle is operating whereby the system may set the maximum allowable value of target speed.

The one or more signals may be received by one of more of the speed control systems, which in turn determine the maximum allowable value of target speed. Alternatively, the one or more signals may be received by a controller configured to set the value of maximum target speed of one or more of the speed control systems in dependence on the type of terrain.

The signals may include signals that are set in dependence on one or more of ambient temperature, surface roughness of terrain in which the vehicle is operating, surface wetness or moisture state, surface coefficient of friction between a wheel and the terrain or any other suitable factor that may influence choice of maximum allowable target speed.

The system may be operable to store data in respect of a previous value of target speed for one or more of the speed control systems, wherein if one said one or more speed control systems is reselected to be responsible for speed control following deselection thereof, the reselected system is operable to resume operation at the value of target speed employed by the reselected system when the system was last selected.

This feature has the advantage that a driver may conveniently resume operation at a previous target speed employed by a given speed control system when speed control is resumed by that speed control system.

Thus, if a driver switches speed control systems from a first system to a second system, and reduces a target speed of the second system below the target speed set whilst the first system was operating, upon switching back to the first system the driver may be given the option of resuming operation at the previously set value of target speed of the first system, i.e. the value set prior to deselecting the first speed control system.

The system may be configured wherein if responsibility for speed control is transferred from the first one of the plurality of speed control systems to the second one of the speed control systems whilst the first is accelerating the vehicle to the target speed of the first, the second one of the speed control systems is operable to continue accelerating the vehicle at a rate corresponding to that of the first speed control system.

The rate may be substantially equal to that applied by the first speed control system.

It is so be understood that the second one of the speed control systems may continue accelerating the vehicle at substantially the same rate provided the second one of the speed control systems determines that an increase in vehicle speed above an instant speed of the vehicle is required. The second one of the speed control systems may accelerate the vehicle to the target speed thereof, which is set to be substantially equal to the target speed of the first speed control system, provided any temporary maximum speed imposed by the second one of the speed control systems does not exceed the second target speed value.

In a further aspect of the invention for which protection is sought there is provided a vehicle comprising a control system according to another aspect.

In a still further aspect of the invention for which protection is sought there is provided a method of controlling a vehicle comprising: controlling a speed of a vehicle by means of one of a plurality of speed control systems; and transferring responsibility from a first one of the plurality of speed control systems to a second one of the speed control systems, the method comprising setting a value of target speed of the second one of the speed control systems to a value dependent on the target speed of the first one of the speed control systems when responsibility for speed control is transferred from the first one of the plurality of speed control systems to the second.

The method may comprise setting the value of target speed of the second one of the speed control systems to a value substantially equal to the target speed of the first one of the speed control systems.

In one aspect of the invention for which protection is sought there is provided a vehicle control system comprising a plurality of speed control systems each operable to cause the vehicle to operate in accordance with a respective target speed, the system being operable wherein one of said plurality of speed control systems may be selected to control vehicle speed at a given moment in time, wherein when responsibility for speed control is transferred from a first one of the plurality of speed control systems to a second one of the speed control systems, the second one of the speed control systems is operable to set a value of target speed thereof to a value corresponding to that of the target speed of the first one of the speed control systems.

It is to be understood that the set-speed may also be referred to herein as a 'target speed' and the terms 'target speed' and 'set-speed' are used interchangeably herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the invention will now be described by way of example only with reference to the following figures in which.

DETAILED DESCRIPTION

References herein to a block such as a function block are to be understood to include reference to software code for performing the function or action specified which may be an output that is provided responsive to one or more inputs. The code may be in the form of a software routine or function called by a main computer program, or may be code forming part of a flow of code not being a separate routine or function. Reference to function block is made for ease of explanation of the manner of operation of embodiments of the present invention.

Figure 1:
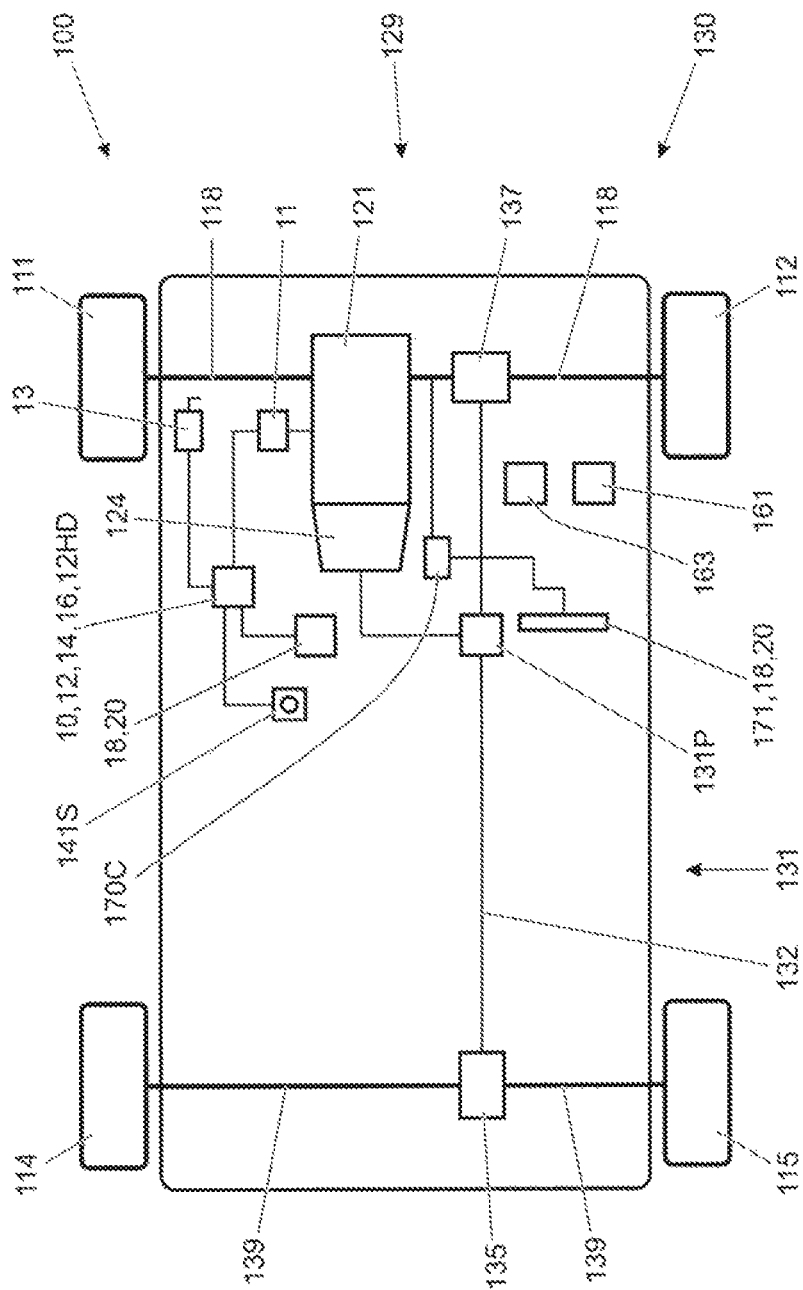
FIG. 1 is a schematic illustration of a vehicle according to an embodiment of the invention in plan view.
Figure 2:
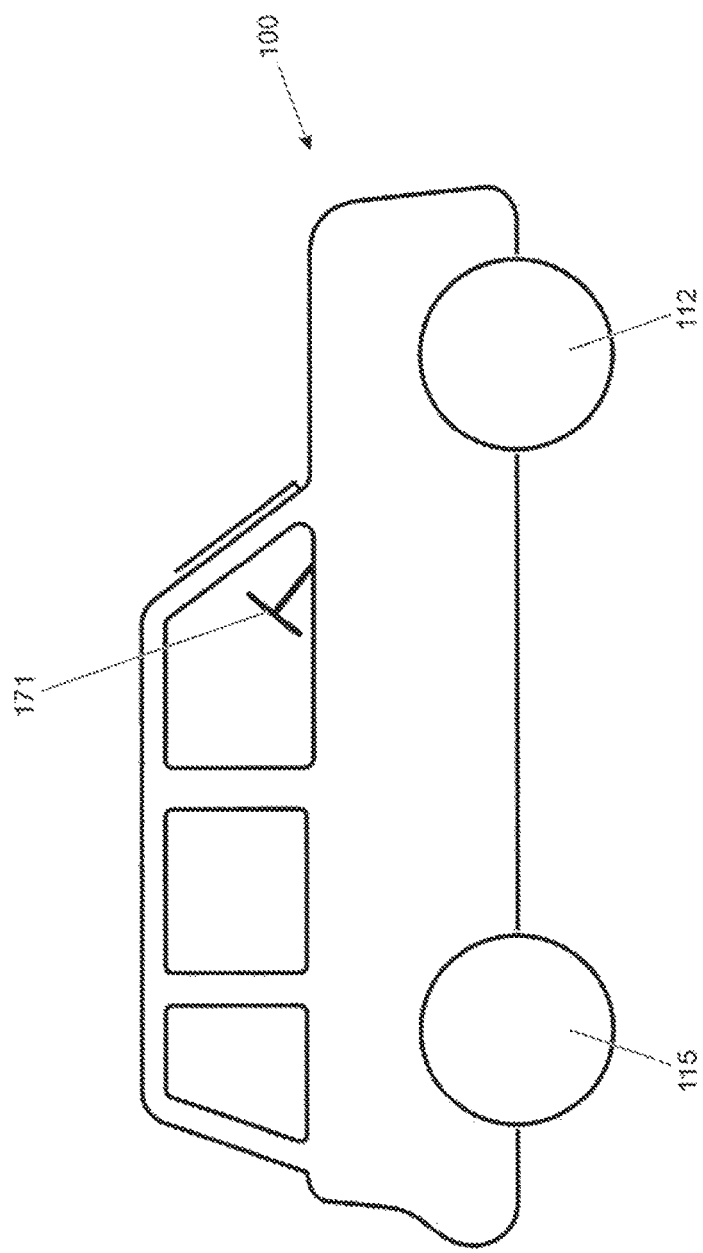
FIG. 2 shows the vehicle of FIG. 1 in side view.

FIG. 1 shows a vehicle 100 according to an embodiment of the present invention. The vehicle 100 has a powertrain 129 that includes an engine 121 that is connected to a driveline 130 having an automatic transmission 124. It is to be understood that embodiments of the present invention are also suitable for use in vehicles with manual transmissions, continuously variable transmissions or any other suitable transmission.

The driveline 130 is arranged to drive a pair of front vehicle wheels 111,112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131P, allowing selectable two wheel drive or four wheel drive operation. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 3:
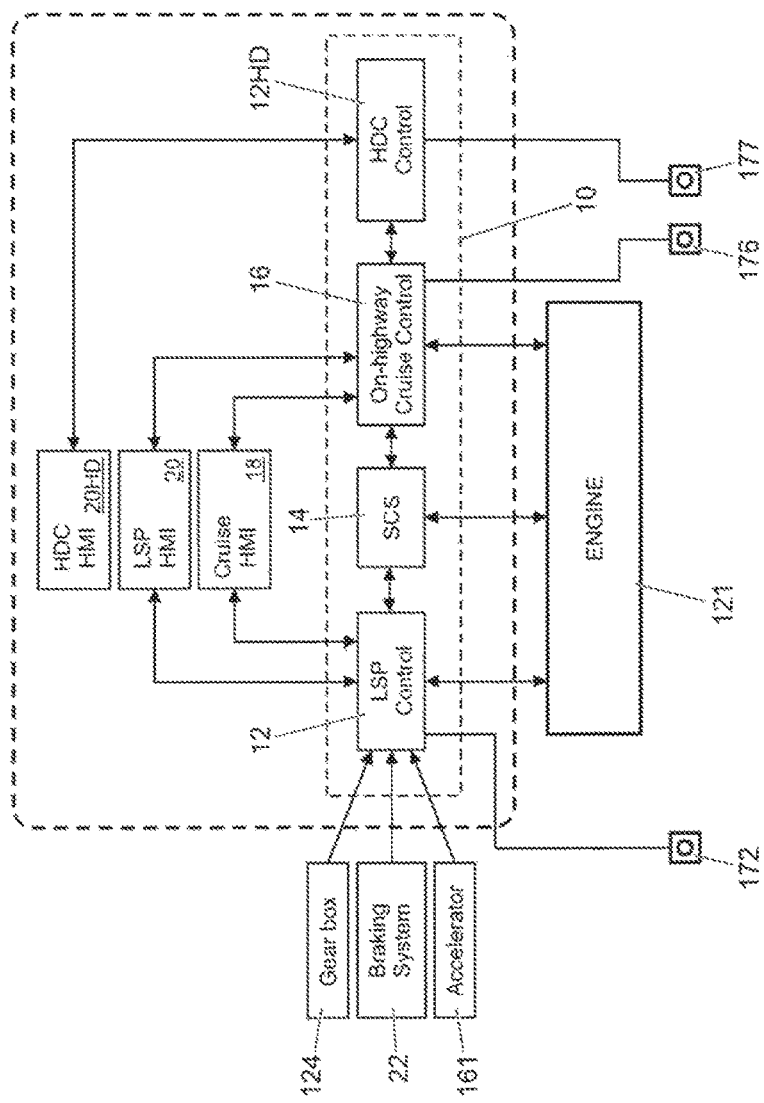
FIG. 3 is a high level schematic diagram of an embodiment of the vehicle speed control system of the present invention, including a cruise control system and a low-speed progress control system.

A control system for the vehicle engine 121 includes a central controller 10, referred to as a vehicle control unit (VCU) 10, a powertrain controller 11, a brake controller 13 and a steering controller 170C. The brake controller 13 forms part of a braking system 22 (FIG. 3). The VCU 10 receives and outputs a plurality of signals to and from various sensors and subsystems (not shown) provided on the vehicle. The VCU 10 includes a low-speed progress (LSP) control system 12 shown in FIG. 3 and a stability control system (SCS) 14. The SCS 14 improves the safety of the vehicle 100 by detecting and managing loss of traction. When a reduction in traction or steering control is detected, the SCS 14 is operable automatically to command a brake controller 13 to apply one or more brakes of the vehicle to help to steer the vehicle 100 in the direction the user wishes to travel. In the embodiment shown the SCS 14 is implemented by the VCU 10. In some alternative embodiments the SCS 14 may be implemented by the brake controller 13. Further alternatively, the SCS 14 may be implemented by a separate controller.

Although not shown in detail in FIG. 3, the VCU 10 further includes a Dynamic Stability Control (DSC) function block, a Traction Control (TC) function block, an Anti-Lock Braking System (ABS) function block and a Hill Descent Control (HDC) function block. These function blocks are implemented in software code run by a computing device of the VCU 10 and provide outputs indicative of, for example, DSC activity, TC activity, ABS activity, brake interventions on individual wheels and engine torque requests from the VCU 10 to the engine 121 in the event a wheel slip event occurs. Each of the aforementioned events indicate that a wheel slip event has occurred. Other vehicle sub-systems such as a roll stability control system or the like may also be useful.

Figure 5:
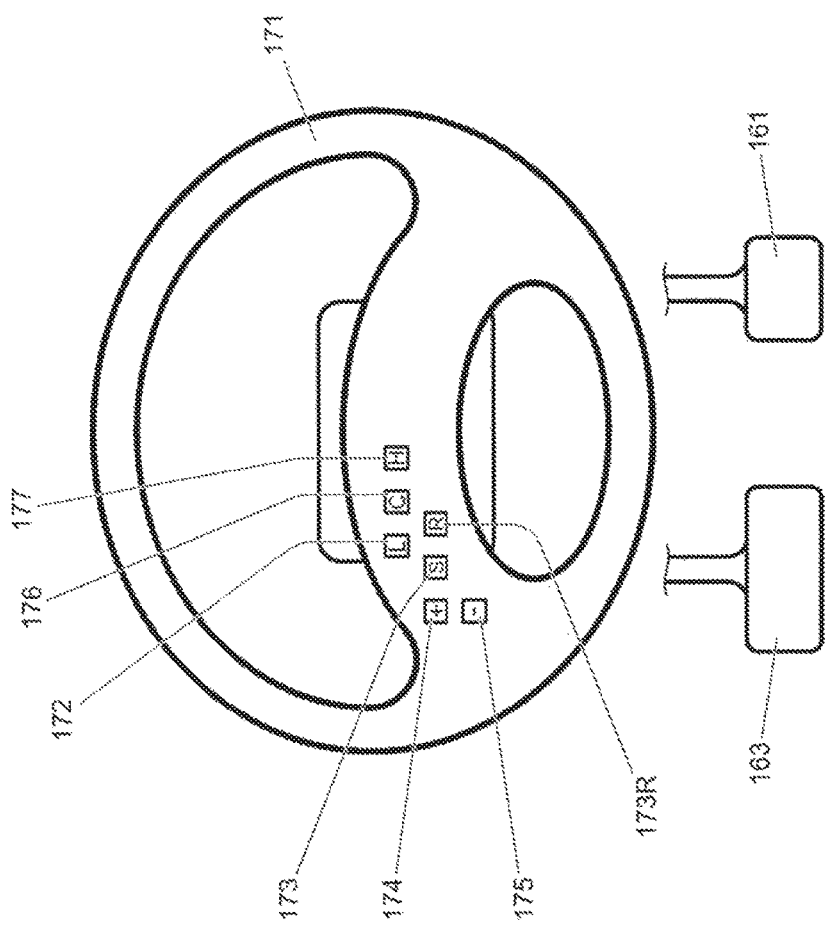
FIG. 5 illustrates a steering wheel and brake and accelerator pedals of a vehicle according to an embodiment of the present invention.

As noted above the vehicle 100 also includes a cruise control system 16 which is operable to automatically maintain vehicle speed at a selected speed when the vehicle is travelling at speeds in excess of 25 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 5). The cruise control system 16 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a '+' button 174 allows the value of cruise_set-speed to be increased whilst depression of a '−' button 175 allows the value of cruise_set-speed to be decreased. A resume button 173R is provided that is operable to control the cruise control system 16 to resume speed control at the instant value of cruise_set-speed following driver over-ride. It is to be understood that known on-highway cruise control systems including the present system 16 are configured so that, in the event that the user depresses a brake pedal 163 or, in the case of vehicles with a manual transmission, a clutch pedal, the cruise control function is cancelled and the vehicle 100 reverts to a manual mode of operation which requires input from an accelerator pedal 161 by a user in order to maintain vehicle speed. In addition, detection of a wheel slip event, as may be initiated by a loss of traction, also has the effect of cancelling the cruise control function. Speed control by the system 16 is resumed if the driver subsequently depresses the resume button 173R.

The cruise control system 16 monitors vehicle speed and any deviation from the target vehicle speed is adjusted automatically so that the vehicle speed is maintained at a substantially constant value, typically in excess of 25 kph. In other words, the cruise control system is ineffective at speeds lower than 25 kph. The cruise control HMI 18 may also be configured to provide an alert to the user about the status of the cruise control system 16 via a visual display of the HMI 18. In the present embodiment the cruise control system 16 is configured to allow the value of cruise_set-speed to be set to any value in the range 25-150 kph.

The LSP control system 12 also provides a speed-based control system for the user which enables the user to select a very low target speed at which the vehicle can progress without any pedal inputs being required by the user. Low-speed speed control (or progress control) functionality is not provided by the on-highway cruise control system 16 which operates only at speeds above 25 kph.

The LSP control system 12 is activated by means of a LSP control system selector button 172 mounted on the steering wheel 171. The system 12 is operable to apply selective powertrain, traction control and braking actions to one or more wheels of the vehicle 100, collectively or individually, to maintain the vehicle 100 at the desired speed.

The LSP control system 12 is configured to allow a user to input a desired value of set-speed parameter, LSP_set-speed to the LSP control system 12 via a low-speed progress control HMI (LSP HMI) 20 (FIG. 1, FIG. 3) which shares certain input buttons 173-175 with the cruise control system 16 and HDC control system 12 HD. Provided the vehicle speed is within the allowable range of operation of the LSP control system (which is the range from 2 to 30 kph in the present embodiment although other ranges are also useful) the LSP control system 12 controls vehicle speed in accordance with the value of LSP_set-speed. Unlike the cruise control system 16, the LSP control system 12 is configured to operate independently of the occurrence of a traction event. That is, the LSP control system 12 does not cancel speed control upon detection of wheel slip. Rather, the LSP control system 12 actively manages vehicle behaviour when slip is detected.

The LSP HMI 20 is provided in the vehicle cabin so as to be readily accessible to the user. The user of the vehicle 100 is able to input to the LSP control system 12, via the LSP HMI 20, an indication of the speed at which the user desires the vehicle to travel (referred to as "the target speed") by means of the 'set-speed' button 173 and the '+'/'−' buttons 174, 175 in a similar manner to the cruise control system 16. The LSP HMI 20 also includes a visual display upon which information and guidance can be provided to the user about the status of the LSP control system 12.

The LSP control system 12 receives an input from the braking system 22 of the vehicle indicative of the extent to which the user has applied braking by means of the brake pedal 163. The LSP control system 12 also receives an input from an accelerator pedal 161 indicative of the extent to which the user has depressed the accelerator pedal 161. An input is also provided to the LSP control system 12 from the transmission or gearbox 124. This input may include signals representative of, for example, the speed of an output shaft of the gearbox 124, torque converter slip and a gear ratio request. Other inputs to the LSP control system 12 include an input from the cruise control HMI 18 which is representative of the status (ON/OFF) of the cruise control system 16, and an input from the LSP control HMI 20.

The HDC function block of the VCU 10 forms part of a HDC system 12 HD. When the HDC system 12 HD is active, the system 12 HD controls the braking system 22 (of which the ABS function block forms part) in order to limit vehicle speed to a value corresponding to that of a HDC set-speed parameter HDC_set-speed which may be set by a user. The HDC set-speed may also be referred to as an HDC target speed. Provided the user does not override the HDC system by depressing the accelerator pedal 161 when the HDC system is active, the HDC system 12 HD controls the braking system 22 (FIG. 3) to prevent vehicle speed from exceeding the HDC_set-speed. In the present embodiment the HDC system 12 HD is not operable to apply positive drive torque. Rather, the HDC system 12 HD is only operable to apply negative brake torque.

A HDC system HMI 20 HD is provided by means of which a user may control the HDC system 12 HD, including setting the value of HDC_set-speed. An HDC system selector button 177 is provided on the steering wheel 171 by means of which a user may activate the HDC system 12 HD to control vehicle speed.

As noted above, the HDC system 12 HD is operable to allow a user to set a value of HDC set-speed parameter HDC_set-speed and to adjust the value of HDC_set-speed using the same controls as the cruise control system 16 and LSP control system 12. Thus, in the present embodiment, when the HDC system 12 HD is controlling vehicle speed, the HDC system set-speed may be increased, decreased or set to an instant speed of the vehicle, that is to say the prevailing speed of the vehicle, in a similar manner to the set-speed of the cruise control system 16 and LSP control system, using the same control buttons 173, 173R, 174, 175. The HDC system 12 HD is operable to allow the value of HDC_set-speed to be set to any value in the range from 2-30 kph. Other values are also useful.

If the HDC system 12 HD is selected when the vehicle 100 is travelling at a speed of 30 kph or less and no other speed control system is in operation, the HDC system 12 HD assumes a standby mode. If the user subsequently presses the 'set-speed' button 173 the HDC system 12 HD sets the value of HDC_set-speed to the instant or prevailing vehicle speed. If the HDC system 12 HD is selected when the vehicle 100 is travelling at a speed above 30 kph but not exceeding 50 kph and the driver is not depressing the accelerator pedal 161, the HDC system 12 HD is configured to slow the vehicle to 30 kph, being the maximum allowable value of HDC_set-speed by means of the powertrain 129 and/or braking system 22 at a deceleration rate not exceeding a maximum allowable rate. The rate may be 1.25 ms-2 or any other suitable value. The HDC system then assumes the standby mode until the driver sets a value of HDC_set-speed.

It is to be understood that the VCU 10 is configured to implement a known Terrain Response (TR) (RTM) System of the kind described above in which the VCU 10 controls settings of one or more vehicle systems or sub-systems such as the powertrain controller 11 in dependence on a selected driving mode. The driving mode may be selected by a user by means of a driving mode selector 141S (FIG. 1). The driving modes may also be referred to as terrain modes, terrain response modes, terrain programs or control modes. In the embodiment of FIG. 1 four driving modes are provided: an 'on-highway' driving mode suitable for driving on a relatively hard, smooth driving surface where a relatively high surface coefficient of friction exists between the driving surface and wheels of the vehicle; a 'sand' driving mode suitable for driving over sandy terrain; a 'grass, gravel or snow' driving mode suitable for driving over grass, gravel or snow, a 'rock crawl' driving mode suitable for driving slowly over a rocky surface; and a 'mud and ruts' driving mode suitable for driving in muddy, rutted terrain. Other driving modes may be provided in addition or instead.

In some embodiments, the LSP control system 12 may be in either one of an active condition, a standby condition and an 'off' condition. In the active condition, the LSP control system 12 actively manages vehicle speed by controlling powertrain torque and braking system torque. In the standby condition, the LSP control system 12 does not control vehicle speed until a user presses the resume button 173R or the 'set speed' button 173. In the off condition the LSP control system 12 is not responsive to input controls unless the LSP control system selector button 172 is depressed.

In the present embodiment the LSP control system 12 is also operable to assume an intermediate condition similar to that of the active mode but in which the LSP control system 12 is prevented from commanding the application of positive drive torque to one or more wheels of the vehicle 100 by the powertrain 129. Thus, only braking torque may be applied, by means of the braking system 22 and/or powertrain 129. Thus the system 12 may prevent excessive speeds from being attained during descent. The intermediate mode may be referred to as a LSP-hill descent (or LSP-HD) mode since it functions in substantially the same way as the HDC system 12 HD. In some embodiments, the LSP control system 12 is configured to trigger the HDC system 12 HD to control vehicle speed when the LSP control system 12 assumes the intermediate mode Other arrangements are also useful.

With the LSP control system 12 in the active condition, the user may increase or decrease the vehicle set-speed by means of the '+' and '−' buttons 174, 175. In addition, the user may also increase or decrease the vehicle set-speed by lightly pressing the accelerator or brake pedals 161, 163 respectively. In some embodiments, with the LSP control system 12 in the active condition the '+' and '−' buttons 174, 175 are disabled such that adjustment of the value of LSP_set-speed can only be made by means of the accelerator and brake pedals 161, 163. This latter feature may prevent unintentional changes in set-speed from occurring, for example due to accidental pressing of one of the '+' or '−' buttons 174, 175. Accidental pressing may occur for example when negotiating difficult terrain where relatively large and frequent changes in steering angle may be required. Other arrangements are also useful.

It is to be understood that in the present embodiment the LSP control system 12 is operable to cause the vehicle to travel in accordance with a value of set-speed in the range from 2-30 kph whilst the cruise control system is operable to cause the vehicle to travel in accordance with a value of set-speed in the range from 25-150 kph although other values are also useful. If the LSP control system 12 is selected when the vehicle speed is above 30 kph but less than or substantially equal to 50 kph, the LSP control system 12 assumes the intermediate mode in which the braking system 22 is employed to slow the vehicle 100 to a value of set-speed corresponding to the value of parameter LSP_set-speed. Once the vehicle speed falls to 30 kph or below, the LSP control system 12 assumes the active condition in which it is operable to apply positive drive torque via the powertrain 129, as well as brake torque via the powertrain 129 (via engine braking) and the braking system 22 in order to control the vehicle in accordance with the LSP_set-speed value. If no LSP set-speed value has been set, the LSP control system 12 assumes the standby mode.

It is to be understood that if the LSP control system 12 is in the active mode, operation of the cruise control system 16 is inhibited. The two systems 12, 16 therefore operate independently of one another, so that only one can be operable at any one time, depending on the speed at which the vehicle is travelling.

In some embodiments, the cruise control HMI 18 and the LSP control HMI 20 may be configured within the same hardware so that, for example, the speed selection is input via the same hardware, with one or more separate switches being provided to switch between the LSP input and the cruise control input.

Figure 4:
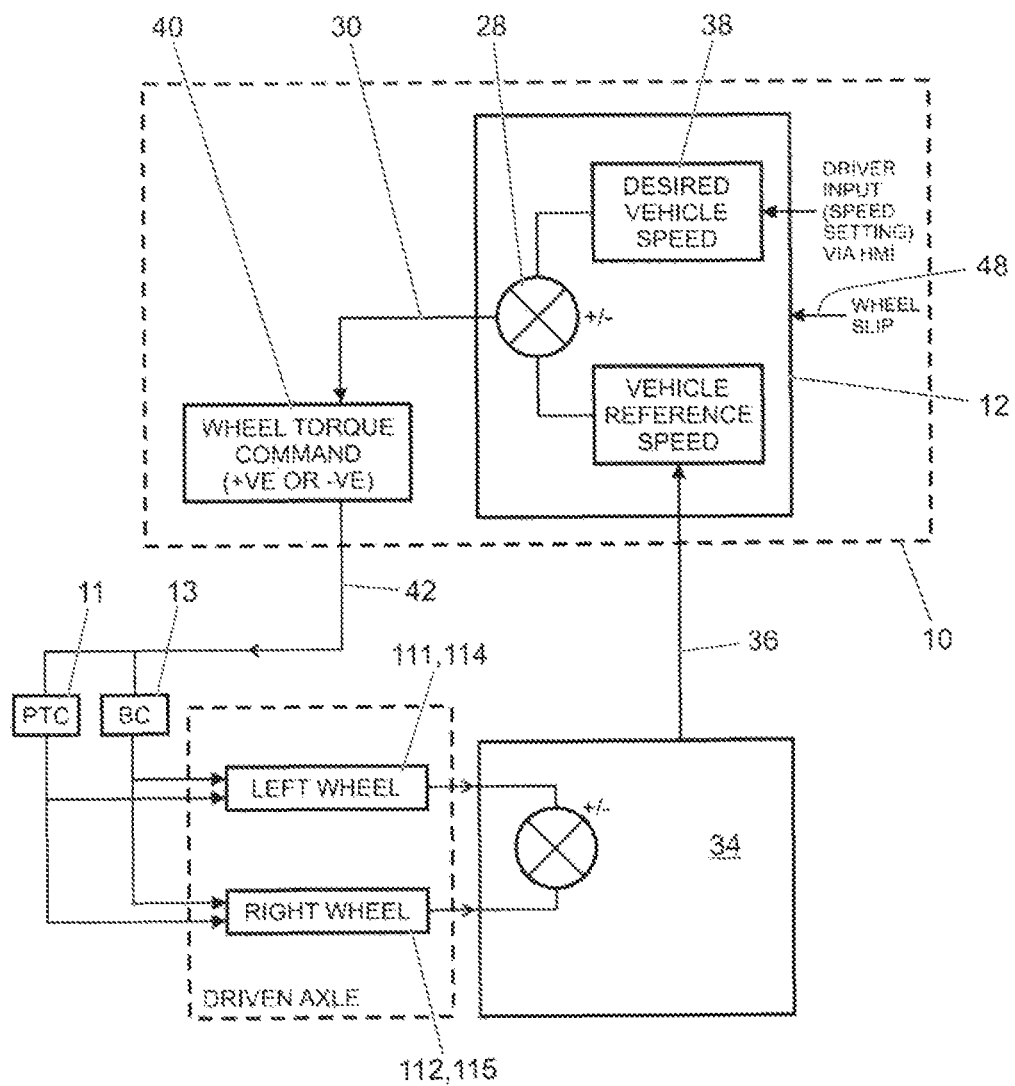
FIG. 4 is a schematic diagram of further features of the vehicle speed control system in FIG. 3.

FIG. 4 illustrates the means by which vehicle speed is controlled in the LSP control system 12. As described above, a speed selected by a user (set-speed) is input to the LSP control system 12 via the LSP control HMI 20. A vehicle speed sensor 34 associated with the powertrain 129 (shown in FIG. 1) provides a signal 36 indicative of vehicle speed to the LSP control system 12. The LSP control system 12 includes a comparator 28 which compares the set-speed 38 (also referred to as a 'target speed' 38) selected by the user with the measured speed 36 and provides an output signal 30 indicative of the comparison. The output signal 30 is provided to an evaluator unit 40 of the VCU 10 which interprets the output signal 30 as either a demand for additional torque to be applied to the vehicle wheels 111-115, or for a reduction in torque applied to the vehicle wheels 111-115, depending on whether the vehicle speed needs to be increased or decreased to maintain the speed LSP_set-speed. An increase in torque is generally accomplished by increasing the amount of powertrain torque delivered to a given position of the powertrain, for example an engine output shaft, a wheel or any other suitable location. A decrease in torque at a given wheel to a value that is less positive or more negative may be accomplished by decreasing powertrain torque delivered to a wheel and/or by increasing a braking force on a wheel. It is to be understood that in some embodiments in which a powertrain 129 has one or more electric machines operable as a generator, negative torque may be applied by the powertrain 129 to one or more wheels by the electric machine. Negative torque may also be applied by means of engine braking in some circumstances, depending at least in part on the speed at which the vehicle 100 is moving. If one or more electric machines are provided that are operable as propulsion motors, positive drive torque may be applied by means of the one or more electric machines.

An output 42 from the evaluator unit 40 is provided to the powertrain controller 11 and brake controller 13 which in turn control a net torque applied to the vehicle wheels 111-115. The net torque may be increased or decreased depending on whether the evaluator unit 40 demands positive or negative torque. In order to cause application of the necessary positive or negative torque to the wheels, the evaluator unit 40 may command that positive or negative torque is applied to the vehicle wheels by the powertrain 129 and/or that a braking force is applied to the vehicle wheels by the braking system 22, either or both of which may be used to implement the change in torque that is necessary to attain and maintain a required vehicle speed. In the illustrated embodiment the torque is applied to the vehicle wheels individually so as to maintain the vehicle at the required speed, but in another embodiment torque may be applied to the wheels collectively to maintain the required speed. In some embodiments, the powertrain controller 11 may be operable to control an amount of torque applied to one or more wheels by controlling a driveline component such as a rear drive unit, front drive unit, differential or any other suitable component. For example, one or more components of the driveline 130 may include one or more clutches operable to allow an amount of torque applied to one or more wheels to be varied. Other arrangements are also useful. Where a powertrain 129 includes one or more electric machines, for example one or more propulsion motors and/or generators, the powertrain controller 11 may be operable to modulate torque applied to one or more wheels by means of one or more electric machines.

The LSP control system 12 also receives a signal 48 indicative of a wheel slip event having occurred. This may be the same signal 48 that is supplied to the on-highway cruise control system 16 of the vehicle, and which in the case of the latter triggers an override or inhibit mode of operation in the on-highway cruise control system 16 so that automatic control of vehicle speed by the on-highway cruise control system 16 is suspended or cancelled. However, the LSP control system 12 is not arranged to cancel or suspend operation in dependence on receipt of a wheel slip signal 48 indicative of wheel slip. Rather, the system 12 is arranged to monitor and subsequently manage wheel slip so as to reduce driver workload. During a slip event, the LSP control system 12 continues to compare the measured vehicle speed with the value of LSP_set-speed, and continues to control automatically the torque applied to the vehicle wheels so as to maintain vehicle speed at the selected value. It is to be understood therefore that the LSP control system 12 is configured differently to the cruise control system 16, for which a wheel slip event has the effect of overriding the cruise control function so that manual operation of the vehicle must be resumed, or speed control by the cruise control system 12 resumed by pressing the resume button 173R or set-speed button 173.

In a further embodiment of the present invention (not shown) a wheel slip signal 48 is derived not just from a comparison of wheel speeds, but further refined using sensor data indicative of the vehicle's speed over ground. Such a speed over ground determination may be made via global positioning (GPS) data, or via a vehicle mounted radar or laser based system arranged to determine the relative movement of the vehicle 100 and the ground over which it is travelling. A camera system may be employed for determining speed over ground in some embodiments.

At any stage of the LSP control process the user can override the function by depressing the accelerator pedal 161 and/or brake pedal 163 to adjust the vehicle speed in a positive or negative sense. However, in the event that a wheel slip event is determined via signal 48, the LSP control system 12 remains active and control of vehicle speed by the LSP control system 12 is not suspended. As shown in FIG. 4, this may be implemented by providing a wheel slip event signal 48 to the LSP control system 12 which is then managed by the LSP control system 12. In the embodiment shown in FIG. 1 the SCS 14 generates the wheel slip event signal 48 and supplies it to the LSP control system 12 and cruise control system 16.

A wheel slip event is triggered when a loss of traction occurs at any one of the vehicle wheels. Wheels and tyres may be more prone to losing traction when travelling for example on snow, ice, mud or sand and/or on steep gradients or cross-slopes. A vehicle 100 may also be more prone to losing traction in environments where the terrain is more uneven or slippery compared with driving on a highway in normal on-road conditions. Embodiments of the present invention therefore find particular benefit when the vehicle 100 is being driven in an off-road environment, or in conditions in which wheel slip may commonly occur. Manual operation by the user in such conditions can be a difficult and often stressful experience and may result in an uncomfortable ride for vehicle occupants.

The vehicle 100 is also provided with additional sensors (not shown) which are responsive to a variety of different parameters associated with vehicle motion and status. These may be inertial systems unique to the LSP or HDC control system 12, 12 HD or part of an occupant restraint system or any other sub-system which may provide data from sensors such as gyros and/or accelerometers that may be indicative of vehicle body movement and may provide a useful input to the LSP and/or HDC control systems 12, 12 HD. The signals from the sensors provide, or are used to calculate, a plurality of driving condition indicators (also referred to as terrain indicators) which are indicative of the nature of the terrain conditions over which the vehicle is travelling.

The sensors (not shown) on the vehicle 100 include, but are not limited to, sensors which provide continuous sensor outputs to the VCU 10, including wheel speed sensors, as mentioned previously and as shown in FIG. 5, an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the stability control system (SCS), a brake pedal position sensor, a brake pressure sensor, an accelerator pedal position sensor, longitudinal, lateral and vertical motion sensors, and water detection sensors forming part of a vehicle wading assistance system (not shown). In other embodiments, only a selection of the aforementioned sensors may be used.

The VCU 10 also receives a signal from the steering controller 170C. The steering controller 170C is in the form of an electronic power assisted steering unit (ePAS unit). The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C.

The VCU 10 evaluates the various sensor inputs to determine the probability that each of a plurality of different control modes (driving modes) for the vehicle subsystems is appropriate, with each control mode corresponding to a particular terrain type over which the vehicle is travelling (for example, mud and ruts, sand, grass/gravel/snow).

If the user has selected operation of the vehicle in an automatic driving mode selection condition, the VCU 10 then selects the most appropriate one of the control modes and is configured automatically to control the subsystems according to the selected mode. This aspect of the invention is described in further detail in our co-pending patent application nos. GB1111288.5, GB1211910.3 and GB1202427.9, the contents of each of which is incorporated herein by reference.

The nature of the terrain over which the vehicle is travelling (as determined by reference to the selected control mode) may also be utilised in the LSP control system 12 to determine an appropriate increase or decrease in drive torque that is to be applied to the vehicle wheels. For example, if the user selects a value of LSP_set-speed that is not suitable for the nature of the terrain over which the vehicle is travelling, the system 12 is operable to automatically adjust the vehicle speed downwards by reducing the speed of the vehicle wheels. In some cases, for example, the user selected speed may not be achievable or appropriate over certain terrain types, particularly in the case of uneven or rough surfaces. If the system 12 selects a set-speed that differs from the user-selected set-speed, a visual indication of the speed constraint is provided to the user via the LSP HMI 20 to indicate that an alternative speed has been adopted.

As described above, the vehicle 100 has three speed control systems: a low speed progress control (LSP) system 12, an on-highway cruise control system 16 and a hill descent control (HDC) system 12 HD. Each of the systems is configured to store in a memory a current value of a corresponding set-speed parameter associated with that system.

The speed control systems 12, 16, 12 HD are operable to communicate with one another via control lines connected therebetween in order to 'share' their respective set-speed values with one another. In some embodiments the systems 12, 16, 12 HD are configured to communicate with one another via a controller area network (CAN) bus, by means of a private network, or by any other suitable means. In some embodiments the control systems 12, 16, 12 HD are implemented in software code run on a single computing device that stores data in respect of set-speeds of the respective control systems in a memory. Other arrangements are also useful.

When operating with any one of the control systems 12, 16, 12 HD in an 'active' state in which the system 12, 16, 12 HD is responsible for controlling vehicle speed, the user may increase or decrease set speed by means of the '+' and '−' buttons 174, 175 or cause the set-speed to be set to the current vehicle speed by depressing the 'set-speed' control button 173.

A user may switch from one speed control system (being the 'currently selected' speed control system) to another speed control system by simply selecting the required speed control system by means of the corresponding selector control 172, 176, 177.

When the user does this, the 'newly selected' speed control system checks the instant value of vehicle speed. If the instant value of vehicle speed is outside a range of speed values permitting operation of the newly selected speed control system, the VCU 10 ignores the user request to switch to a different speed control system and the currently selected speed control system remains in control of vehicle speed. Notification may be provided to the user indicating the reason the VCU 10 has ignored the request.

If the instant speed of the vehicle 100 is within the range of allowable values for operation of the newly selected speed control system, the VCU 10 checks whether the value of set-speed parameter of the currently selected speed control system falls within the range of allowable values of the newly selected system. If the value does fall within the range of allowable values, the newly selected system sets the value of set-speed parameter thereof to the value of set-speed parameter of the currently selected system. The currently selected speed control system is then deselected and the newly selected speed control system assumes control of vehicle speed. The newly selected speed control system then controls vehicle speed in accordance with the value of set-speed parameter thereof.

In some embodiments, if a user selects a new speed control system by means of the corresponding selector control 172, 176, 177 when the current vehicle speed is not within the range of allowable speeds for which the newly selected speed control system may become active, and the user either holds the selector control in a 'select' condition for a period exceeding a prescribed period (such as 1s) or selects the new speed control system more than once within a period of (say) 1s (or any other suitable value), the VCU 10 is configured to command a change in vehicle speed to bring the vehicle speed within the range of allowable values of speed for the newly selected speed control system.

If, before the newly selected speed control system takes over speed control, the newly selected speed control system determines that the value of set-speed parameter of the currently selected speed control system is not within the permitted range of values of speed of the newly selected system, but the instant vehicle speed is within a range of values for which the newly selected system is permitted to assume an intermediate mode in which the newly selected system cannot command application of positive drive torque but may command application of brake torque (e.g. by means of the powertrain 129 and/or braking system 22), the value of set-speed of the newly selected speed control system is set to a value that is the closest allowable value to that of the currently selected speed control system. The newly selected speed control system then assumes the intermediate mode of operation and the previously selected speed control system is deselected. In this situation, once vehicle speed subsequently falls within the range of allowable values of the newly selected speed control system in the active condition (or mode), the newly selected speed control system assumes the active condition (or mode) and takes over control of vehicle speed in accordance with the value of set-speed parameter of that speed control system.

As stated above if instant vehicle speed is outside the range of permitted values for operation of a newly selected speed control system in either its active or any intermediate mode of operation, the currently selected speed control system may continue to control vehicle speed. An indication may be provided to a user informing the user that the newly selected speed control system is inoperable at the current vehicle speed. Thus, a new speed control system may only be selectable for vehicle speed control when the current speed of the vehicle 100 falls within the allowable range of speeds of an active or intermediate mode of operation of the new speed control system. Other arrangements are also useful.

By way of example, in use the vehicle 100 may be travelling on-highway with the cruise control system 16 active and responsible for maintaining vehicle speed in accordance with a current value of cruise_set-speed parameter. The driver may then depress the LSP control system selector button 172 to switch speed control from the cruise control system 16 to the LSP control system 12.

In this situation, the LSP control system 12 checks whether instant vehicle speed is within the allowable range for operation of the LSP control system 12 in the intermediate or active modes (2-50 kph). If the instant speed is within the allowable range, the system 12 checks the current value of cruise_set-speed parameter. If the value of cruise_set-speed parameter is within the range of allowable values of LSP_set-speed, i.e. in the range from 2-50 kph, the LSP control system 12 sets the value of LSP_set-speed to the current value of cruise_set-speed. The cruise control system 16 is then deselected and the LSP control system 12 is selected for operation in the intermediate or active mode depending on the vehicle speed.

If the value of cruise_set-speed is greater than the maximum allowable value of LSP_set-speed, but the vehicle speed is within the range of operation of the LSP control system in the intermediate or active modes, the LSP control system 12 sets the value of LSP_set-speed to the instant vehicle speed if the instant speed is within the range of allowable values of LSP_set-speed. If the instant speed is above the maximum allowable value of LSP_set-speed, the LSP control system 12 sets the value of LSP_set-speed to the maximum allowable value of LSP_set-speed (being 30 kph in the present embodiment). The cruise control system 16 is then deselected and the LSP control system 12 is selected for operation in the intermediate or active mode depending on the vehicle speed.

As described above, when in the intermediate mode of operation the LSP control system 12 is configured to slow the vehicle to the LSP_set-speed value using the braking system 22 and powertrain 129. However the LSP control system 12 is not permitted to apply positive drive torque (positive powertrain torque) when in the intermediate mode. It is to be understood that the intermediate mode of operation of the LSP control system 12 is similar to the active mode of operation of the HDC system 12 HD. That is, the powertrain 129 and braking system 22 may be employed to slow the vehicle, but the HDC system 12 HD is not permitted to command positive powertrain torque.

If the vehicle speed is such that the intermediate mode of operation of the LSP control system 12 is assumed, the LSP control system 12 employs the powertrain 129 and braking system 22 as required in order to slow the vehicle 100 to the LSP_set-speed. Once the vehicle speed is within the allowable range of operation of the LSP control system 12 in the active mode (i.e. in the range from 2-30 kph) the LSP control system 12 assumes the active mode and attempts to control vehicle speed in accordance with the LSP_set-speed value. If the VCU 10 has determined that the value of LSP_set-speed is too high for the prevailing terrain conditions, the LSP control system 12 may be commanded temporarily to control the vehicle in accordance with a reduced value of set-speed.

If when the cruise control system 16 is the currently selected speed control system the driver depresses the LSP control system selector button 172 when the instant or prevailing vehicle speed is within the allowable range of values for the LSP control system 12 in the active mode and the value of cruise_set-speed is within the allowable range of values of LSP_set-speed, the value of LSP_set-speed is set to be substantially equal to the current value of cruise_set-speed. The cruise control system 16 is then deselected and the LSP control system 12 selected as the system responsible for speed control in the active mode of operation.

If the driver presses the resume button 173R for the first time after selecting a new speed control system, and the new speed control system is in an active or intermediate mode or condition, the value of set-speed of the newly selected speed control system is set to the most recent value of set-speed that was employed by that control system the last time that control system was active.

Thus, if the driver presses the resume button 173R for the first time after selecting the LSP control system 12 and the LSP control system 12 has assumed one of the active or intermediate modes, the value of LSP_set-speed is set to the most recent value of LSP_set-speed that was employed by the LSP control system 12 the last time the LSP control system 12 was active. It is to be understood that this functionality is also provided for the HDC control system 12 HD and the cruise control system 16 although other arrangements are also useful. In some embodiments, a check may be performed to ensure that this most recent, previous value of set-speed is appropriate to the prevailing terrain conditions (e.g. by reference to the selected terrain mode, and/or a determination whether the vehicle is wading) before allowing the value of LS_set-speed to be changed.

Figure 6:
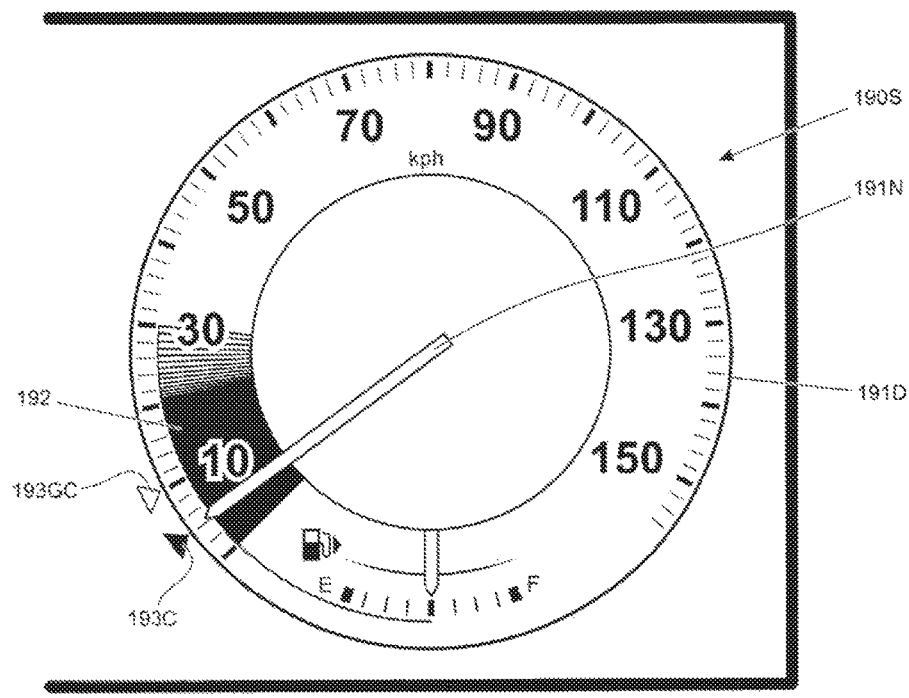
FIG. 6 illustrates a speedometer of the embodiment of FIG. 1.

FIG. 6 is a schematic illustration of a speedometer 190S of the vehicle 100 that is visible to the driver whilst driving the vehicle 100. The speedometer has a needle 191N that points to speed indicia on a substantially circular dial 191D thereby to indicate current vehicle speed.

When either the LSP control system 12 or the HDC system 12 HD is active, the range of speed over which the system 12, 12 HD is operable to set a value of set-speed thereof is highlighted on the speedometer 190S in the form of a band 192. This allows a driver to determine readily whether the current vehicle speed as indicated by the needle 191N is within a range of allowable values of set-speed. In the example shown, the LSP control system 12 is active and the band 192 highlights the speed range from 2 to 30 kph.

A speed indicator icon or chaplet 193C is displayed on an outer edge of the speedometer dial 191D and indicates the current value of LSP_set-speed. A similar chaplet is displayed when the cruise control system 16 or the HDC control system 12 HD is active, indicating the currently set values of cruise_set-speed and HDC_set-speed respectively.

A ghost chaplet 193GC may also be displayed on the speedometer 191S. The ghost chaplet 193GC is displayed at a location corresponding to the value of set-speed that was employed when the currently selected speed control system was previously selected to control vehicle speed. Thus, if the driver switches from the LSP control system 12 to another system 12 HD, 16 such as the HDC control system 12 HD, the LSP control system 12 stores the value of LSP_set-speed in a memory thereof and retains it for use when the LSP control system 12 is next selected. When the LSP control system 12 is next selected, the LSP control system 12 retrieves the previously stored value of LSP_set-speed and displays the ghost chaplet 193GC at a location corresponding to the previously stored value. Other arrangements are also useful.

If the vehicle 100 is operating with the LSP control system 12 active and the driver selects operation of the cruise control system 16 by depressing the cruise control system selector button 176, the cruise control system 16 determines whether the current value of LSP_set-speed is within the allowable range of values of cruise_set-speed (i.e. whether the value of LSP_set-speed is in the range from 25-30 kph, being the range of overlap of values of LSP_set-speed and cruise_set-speed), and whether vehicle speed is within the allowable range of values for operation of the cruise control system 16 (i.e. 25-150 kph). If the value of LSP_set-speed is within the range 25-30 kph and vehicle speed is in the range from 25-150 kph, the cruise control system 16 sets the value of cruise_set-speed substantially equal to the current value of LSP_set-speed. The LSP control system 12 is then deselected and the cruise control system 16 selected as the system responsible for speed control. In some embodiments, if the instant vehicle speed is greater than the current value of LSP_set-speed and vehicle speed is within the range of allowable values for the cruise control system 16 in the active mode, the value of cruise_set-speed is set to the instant value of vehicle speed.

If the driver selects operation of the cruise control system 16 when vehicle speed is within the range of allowable values for operation of the cruise control system 16 but the value of LSP_set-speed is below the minimum allowable value of cruise_set-speed, the LSP_control system 12 is deactivated and the cruise control system 16 assumes a standby mode. If the user subsequently presses the set-speed button 173 the cruise control system 16 assumes the active mode and sets the value of cruise_set-speed to the instant value of vehicle speed in the usual manner. If instead the driver presses the resume button 173R the cruise control system 16 assumes the active mode and the value of cruise_set-speed is set to the previously stored value of cruise_set-speed. The stored value corresponds to the most recent value of cruise_set-speed that was employed when the cruise control system 16 was last active, as described above.

Embodiments of the present invention have the advantage that vehicle composure may be enhanced. This is because when a user switches from one speed control system to another, the new speed control system does not simply take a 'snapshot' of actual vehicle speed at the moment it is selected and set the value of set-speed parameter of that system to the current vehicle speed. Rather, the set-speed parameter of the new speed control system is set to the value employed by the previous speed control system.

The benefit of this feature may be appreciated by considering a scenario in which a first speed control system is in the process of accelerating the vehicle from a speed below the set-speed value to the set-speed value when the driver selects a second different speed control system instead of the first. Subject to various conditions being met as described above, the second speed control system will continue accelerating the vehicle to the same set-speed value when it takes over responsibility for speed control. Some embodiments of the present invention may therefore enhance vehicle composure by maintaining acceleration of the vehicle when the new speed control system assumes vehicle control. Furthermore, embodiments of the present invention may reduce driver workload since selecting a new speed control system would otherwise necessitate selecting a new set-speed value separately from the set-speed employed in the previously selected speed control system. This requirement would add a further operational step to the driver's workload and potentially interrupt progress of the vehicle.

In one example of system operation, a vehicle 100 may be driving with the LSP control system 12 active and controlling vehicle speed in accordance with a value of LSP_set-speed of 30 kph. A driver of the vehicle 100 may depress the brake pedal 163 to slow the vehicle 100 to a speed of 20 kph temporarily. The LSP control system 12 responds by assuming a standby mode in which it does not take any action to control the braking system 22 or powertrain 129. When the driver subsequently presses the resume button 173R, the LSP control system 12 assumes the active mode and begins to accelerate the vehicle 100 towards the LSP_set-speed value (30 kph in this example). If the user then selects operation of the cruise control system 16 the cruise control system 16 checks that the current vehicle speed is within the allowable range of operation of the cruise control system 16. Provided the vehicle speed exceeds 25 kph when the cruise control system selector button 176 is depressed, the cruise control system 16 verifies that the value of LSP_set-speed is within the range of allowable values of cruise_set-speed. Since a value of 30 kph is within the range from 25 to 150 kph the cruise control system 16 then sets the value of cruise_set-speed to the current value of LSP_set-speed. The LSP control system 12 is then deselected and the cruise control system 16 selected as the system responsible for speed control. The cruise control system then continues accelerating the vehicle 100 from its current speed to the cruise_set-speed value (30 kph).

It is to be understood that if the driver selects operation of the HDC control system 12 HD when the LSP control system 12 or cruise control system 16 is active, the HDC control system 12 HD checks whether vehicle speed is within the allowable range of values of speed of the HDC system 12 HD (i.e. 2-50 kph). If the speed is within the allowable range of values, the system 12 HD then checks whether the value of set-speed parameter for the currently selected speed control system is within the allowable range of values of HDC_set-speed (i.e. 2-30 kph). If this condition is also met, the HDC system 12 HD sets the value of HDC_set-speed to the value of set-speed of the currently selected speed control system and assumes the active mode. The HDC system 12 HD then causes vehicle speed to be controlled in accordance with the value of HDC_set-speed. That is, the HD system 12 HD controls vehicle speed such that it does not exceed the value of HDC_set-speed.

In one example scenario, a user may operate the vehicle 100 with the cruise control system 16 active whilst driving on a highway with a desired value of cruise_set-speed of (say) 50 kph. The driver may reduce the value of cruise_set-speed down to a value of 25 kph as the vehicle 100 approaches and then follows a farm track. As the driving surface of the farm track becomes increasingly rough, the driver may then select the LSP control system 12 by pressing the LSP control system selector button 172. Because the value of cruise_set-speed (25 kph) is within the range of allowable values of the LSP control system 12 (i.e. 2-30 kph), and vehicle speed is within the range of allowable values for operation of the LSP control system 12 in the active mode, the LSP control system 12 sets the value of LSP_set-speed to the value of cruise_set-speed, i.e. 25 kph, and assumes the active mode of operation.

As the track becomes more rough and/or slippery the driver may reduce the value of LSP_set-speed still further. The gradient of the track may then become sufficiently steep that the driver decides to select the HDC control system 12. The HDC control system 12 checks that the current vehicle speed (say 10 kph) is within the allowable range for operation of the HDC control system (2-50 kph) and that the value of LSP_set-speed is within the allowable range of values of HDC_set-speed (2-30 kph). If these conditions are met, the HDC control system 12 HD sets the value of HDC_set-speed to the instant value of LSP_set-speed. The LSP control system 12 is then deselected and the HDC control system 12 HD assumes control of vehicle speed.

The user may then adjust the value of HDC_set-speed using the controls mounted on the steering wheel 171.

If the driver subsequently reselects the LSP control system 12, the LSP control system 12 checks whether vehicle speed is within the allowable range of values of the LSP control system 12. If this is the case, the LSP_control-system checks that the current value of HDC_set-speed is within the range of allowable values of LSP_set-speed. If this is the case, the value of LSP_set-speed is set to the instant value of HDC_set-speed. The HDC control system 12 HD is deselected and the LSP control system 12 assumes speed control in the active or intermediate modes depending on vehicle speed. As described above, the value of LSP_set-speed employed when the LSP control system 12 was last in the active or intermediate modes of operation is displayed on the speedometer 190S by means of a ghost chaplet 193GC. The driver may set the current value of LSP_set-speed to the value indicated by the ghost chaplet 193GC by depressing the resume button 173R.

For example, if the vehicle is travelling under the control of the LSP control system 12 with a set-speed LSP_set-speed of 25 km/h and a speed of substantially 25 km/h, and the driver selects the HDC control system 12 HD, the HDC control system 12 HD sets the value of HDC_set-speed to 25 km/h and assumes control of vehicle speed instead of the LSP control system 12. The driver may then reduce the value of HDC_set-speed to (say) 10 km/h before switching control of vehicle speed back to the LSP control system 12. The LSP control system 12 will then assume control of vehicle speed, with the value of LSP_set-speed set to 10 km/h. If the driver subsequently presses the resume button 173R, the LSP control system 12 sets the value of LSP_set-speed to the value most recently employed the previous time the LSP control system 12 was operating, i.e. 25 km/h.

If the driver subsequently re-selects the HDC control system 12 HD, the value of HDC_set-speed last employed by the HDC control system 12 HD is displayed by the ghost chaplet 193GC, and the driver may set the prevailing value of HDC_set-speed when the HDC control system 12 is selected to the speed indicated by the ghost chaplet 193GC by pressing the resume button 173R.

Figure 7:
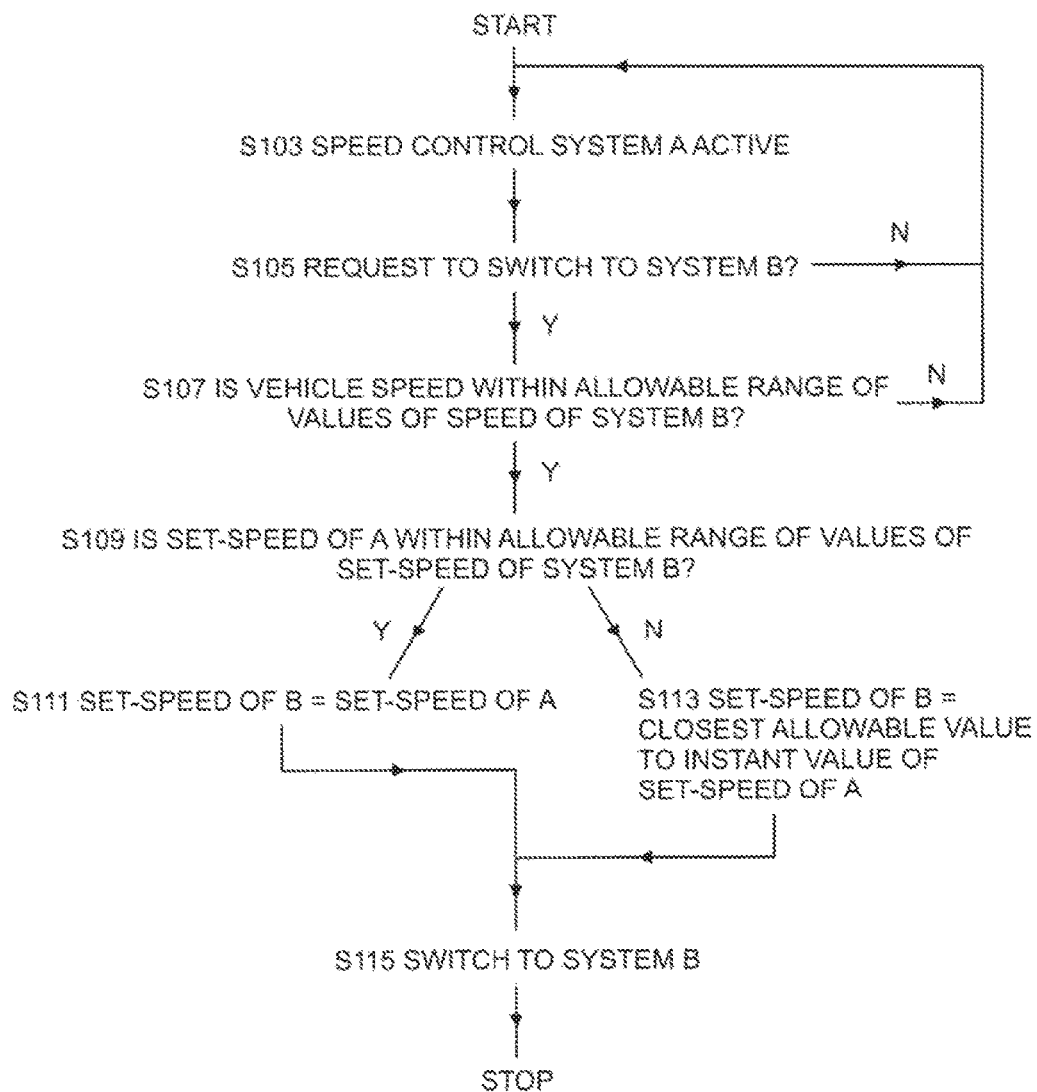
FIG. 7 is a flow diagram illustrating operation of a vehicle control system according to an embodiment of the present invention.

FIG. 7 is a flow diagram illustrating a method according to an embodiment of the present invention by which speed control by one system (system A) may be cancelled in favour of speed control by another system (system B).

At step S103 speed control system A is active. Speed control system A may be any suitable speed control system such as a cruise control system 16, LSP control system 12 or HDC control system 12 HD.

At step S105, a controller such as VCU 10 determines whether a request to switch to speed control system B has been received. Speed control system B may be any other one of two or more speed control systems 16, 12, 12 HD that the vehicle 100 is provided with other than system A. If such a request has not been received the method continues at step S103. If such a request has been received the method continues at step S107.

At step S107 speed control system B checks whether a current value of vehicle speed is within an allowable range for operation of system B. If the speed is not within the allowable range, the method continues at step S103. An indication may be provided to the user that operation of system B is not permitted. If the speed is within the allowable range, the method continues at step S109.

At step S109 system B checks whether the set-speed value of system A is within the allowable range of values of system B. If set-speed is within the allowable range the method continues at step S111 and the value if set-speed of system B is set to the value of set-speed of system A.

If at step S109 the value of set-speed of system A is determined is not to be within the allowable range of values of system B, the method continues at step S113.

At step S113 the value of set-speed of system B is set to the closest allowable value to the instant value of set-speed of system A.

At step S115 speed control system A is deselected and speed control system B is selected for vehicle speed control.

It is to be understood that when at step S115 speed control system B is selected, system B may be caused to assume one of a plurality of modes of operation. For example, if the set-speed of system B has been set to a value higher than that of system A and system B is capable of applying positive drive torque to accelerate the vehicle to a set-speed, system B may assume operation in a standby mode in which the system is not operable to command application of positive drive torque. Other arrangements are also useful.

It will be understood that the embodiments described above are given by way of example only and are not intended to limit the invention, the scope of which is defined in the appended claims.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

This application claims priority from co-pending UK patent application no. GB1214651.0, the entire contents of which are expressly incorporated herein by reference.

The invention claimed is:

1. A vehicle control system comprising a vehicle control unit and a plurality of automatic speed control systems each operable to cause the vehicle to operate in accordance with a respective target speed,
   wherein the vehicle control unit is configured to select a first one of the plurality of automatic speed control systems in response to a user request from a user input interface,
   wherein when the vehicle control unit receives a request from the user input interface to transfer responsibility for speed control from the currently-selected first one of the plurality of automatic speed control systems to a second one of the automatic speed control systems, the vehicle control system is configured to:
   receive an electrical signal indicative of a current value of vehicle speed from a vehicle speed sensor;
   determine whether the current value of vehicle speed is within an allowable range for operation of the second one of the automatic speed control systems; and
   when it is determined that the current value of vehicle speed is within the allowable range, select the second one of the automatic speed control systems and set a value of target speed of the second one of the automatic speed control systems, and wherein the vehicle control unit is configured to set the value of the target speed of the second one of the automatic speed control systems by:

determining if an instant value of the target speed of the first one of the automatic speed control systems is within an allowable range for a target speed of the second one of the automatic speed control systems;

when it is determined that the instant value of the target speed of the first one of the automatic speed control systems is within the allowable range, setting the target speed of the second one of the automatic speed control systems to the target speed of the first one of the automatic speed control systems; and when it is determined that the instant target speed of the first one of the automatic speed control systems is outside the allowable range, setting the target speed of the second one of the automatic speed control systems to the closest allowable value within the allowable range to the instant value of the target speed of the first one of the automatic speed control systems.

2. The vehicle control system according to claim 1 wherein one or more of the automatic speed control systems are configured to cause the vehicle to operate in accordance with a respective temporary maximum speed value that is less than the instant target speed in dependence on one or more parameters.

3. The vehicle control system according to claim 2 wherein one or more of the automatic speed control systems are configured to resume operation at the target speed thereof when the temporary maximum speed value becomes greater than or equal to the target speed or the automatic speed control system no longer causes the vehicle to operate in accordance with the temporary maximum speed value.

4. The vehicle control system according to claim 2 configured to set the temporary maximum speed value of one or more of the automatic speed control systems in dependence on a type of terrain in which the vehicle is operating.

5. The vehicle control system according to claim 4 configured to receive one or more signals indicative of a type of terrain in which the vehicle is operating whereby the system may set the maximum allowable value of target speed.

6. The vehicle control system according to claim 1 configured to store data in respect of a previous value of target speed for one or more of the automatic speed control systems, wherein when one said one or more automatic speed control systems is reselected to be responsible for speed control following deselection thereof, the reselected system is configured to resume operation at the value of target speed employed by the reselected system when the system was last selected.

7. The vehicle control system according to claim 1 configured wherein when responsibility for speed control is transferred from the first one of the automatic speed control systems to the second one of the automatic speed control systems whilst the first is accelerating the vehicle to the target speed of the first, the second one of the automatic speed control systems is configured to continue accelerating the vehicle at a rate corresponding to that of the first one of the automatic speed control systems.

8. The vehicle control system according to claim 1 wherein the vehicle control unit is configured to transfer responsibility for speed control to the second one of the automatic speed control systems only when the current value of vehicle speed is within the allowable range for operation of the second one of the automatic speed control systems and following the setting of the target speed of the second one of the automatic speed control systems.

9. A vehicle comprising the control system according to claim 1.

10. A method of controlling a vehicle comprising:

selecting, by a vehicle control unit, a first one of a plurality of automatic speed control systems in response to a user request received from a user input interface;

receiving, by the vehicle control unit and from the user input interface, a request to transfer responsibility for speed control of the vehicle from the currently-selected first one of the plurality of automatic speed control systems to a second one of the plurality of automatic speed control systems;

receiving, from a vehicle speed sensor, an electrical signal indicative of a current value of vehicle speed;

determining whether the current value of vehicle speed is within an allowable range for operation of the second one of the automatic speed control systems; and when it is determined that the current value of vehicle speed is within the allowable range, selecting the second one of the automatic speed control systems and setting a value of target speed of the second one of the automatic speed control systems by:

determining if an instant value of the target speed of the first one of the automatic speed control systems is within an allowable range for a target speed of the second one of the automatic speed control systems;

when it is determined that the instant value of the target speed of the first one of the automatic speed control systems is within the allowable range, setting the target speed of the second one of the automatic speed control systems to the target speed of the first one of the automatic speed control systems; and when it is determined that the instant value of the target speed of the first one of the automatic speed control systems is outside the allowable range, setting the target speed of the second one of the automatic speed control systems to the closest allowable value within the allowable range to the instant value of the target speed of the first one of the automatic speed control systems.

11. The method according to claim 10 comprising transferring responsibility for speed control from the first one of the automatic speed control systems to the second one of the automatic speed control systems only when the current value of vehicle speed is within the allowable range for operation of the second one of the automatic speed control systems, and following the setting of the target speed of the second automatic speed control system.

12. A vehicle control system comprising a vehicle control unit and plurality of automatic speed control systems each operable to cause the vehicle to operate in accordance with a respective target speed, wherein the vehicle control unit is configured to select a first one of the plurality of automatic speed control systems in response to a user request received from a user input interface;

wherein when the vehicle control unit receives a request from the user input interface to transfer responsibility for speed control from the first one of the automatic speed control systems to a second one of the automatic speed control systems, the vehicle control unit is configured to select the second one of the automatic speed control systems and set a value of target speed of the second one of the automatic speed control systems, and the second one of the automatic speed control systems assumes responsibility for controlling vehicle speed from the first one of the automatic speed control systems, and further wherein the vehicle control unit is configured to set the target speed of the second one of the automatic speed control systems by:

determining if an instant value of the target speed of the first one of the automatic speed control systems is within an allowable range for a target speed of the second one of the automatic speed control systems;

when it is determined that the instant value of the target speed of the first one of the automatic speed control systems is within the allowable range, setting the target speed of the second one of the automatic speed control systems to the target speed of the first one of the automatic speed control systems; and when it is determined that the instant value of the target speed of the first one of the automatic speed control systems is outside the allowable range, setting the target speed of the second one of the automatic speed control systems to the closest allowable value within the allowable range to the instant value of the target speed of the first one of the automatic speed control systems.

13. The vehicle control system according to claim 12 wherein one or more of the automatic speed control systems are configured to cause the vehicle to operate in accordance with a respective temporary maximum speed value that is less than the instant target speed in dependence on one or more parameters.

14. The vehicle control system according to claim 13 wherein one or more of the automatic speed control systems are configured to resume operation at the target speed thereof when the temporary maximum speed value becomes greater than or equal to the target speed or the automatic speed control system no longer causes the vehicle to operate in accordance with the temporary maximum speed value.

15. The vehicle control system according to claim 13 configured to set the temporary maximum speed value of one or more of the automatic speed control systems in dependence on a type of terrain in which the vehicle is operating.

16. The vehicle control system according to claim 15 configured to receive one or more signals indicative of a type of terrain in which the vehicle is operating whereby the system may set the maximum allowable value of target speed.

17. The vehicle control system according to claim 12 configured to store data in respect of a previous value of target speed for one or more of the automatic speed control systems, wherein when one said one or more automatic speed control systems is reselected to be responsible for speed control following deselection thereof, the reselected system is configured to resume operation at the value of target speed employed by the reselected system when the system was last selected.

18. The vehicle control system according to claim 12 configured wherein when responsibility for speed control is transferred from the first one of the automatic speed control systems to the second one of the automatic speed control systems whilst the first is accelerating the vehicle to the target speed of the first, the second one of the automatic speed control systems is configured to continue accelerating the vehicle at a rate corresponding to that of the first one of the automatic speed control systems.

19. A vehicle comprising the vehicle control system according to claim 12.

20. A method of controlling a vehicle comprising:

selecting, by a vehicle control unit, a first one of a plurality of automatic speed control systems in response to a user request received from a user input interface;

controlling a speed of a vehicle by means of the first one of a plurality of automatic speed control systems; and transferring, by the vehicle control unit, responsibility from the first one of the automatic speed control systems to a second one of the automatic speed control systems, the method comprising setting a value of target speed of the second one of the automatic speed control systems when responsibility for speed control is transferred from the first one of the automatic speed control systems to the second one of the automatic speed control systems by:

determining if an instant value of the target speed of the first one of the automatic speed control systems is within an allowable range for a target speed of the second one of the automatic speed control systems;

when it is determined that the instant value of the target speed of the first one of the automatic speed control systems is within the allowable range, setting the target speed of the second one of the automatic speed control systems to the target speed of the first one of the automatic speed control systems; and when it is determined that the instant value of the target speed of the first one of the automatic speed control systems is outside the allowable range, setting the target speed of the second one of the automatic speed control systems to the closest allowable value within the allowable range to the instant value of the target speed of the first one of the automatic speed control systems.

* * * * *